United States Patent Office 3,000,914
Patented Sept. 19, 1961

3,000,914
3β-ALKANOYLOXY-6-METHYL-5,16-PREGNADIEN-20-ONES
Luis E. Miramontes, Miguel A. Romero, and Fortunato Ahmad Farjat, all of Mexico City, Mexico, assignors to G. D. Searle & Co., Chicago, Ill., a corporation of Delaware
No Drawing. Filed May 28, 1958, Ser. No. 738,287
4 Claims. (Cl. 260—397.4)

The present invention relates to a new group of steroids and to a novel process for their preparation. More particularly, this invention relates to esters of 3β-hydroxy-6-alkyl-5,16-pregnadien-20-ones of the structural formula

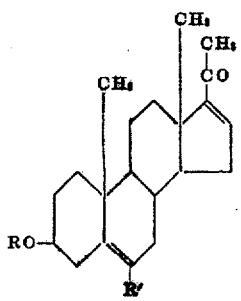

wherein R is an acyl radical derived from a lower hydrocarbon carboxylic acid and R' is a lower alkyl radical.

In the foregoing formula, R can be a formyl, acetyl, propionyl, butyryl, pentanoyl or hexanoyl radical, and R' can be a straight or branched chain propyl, butyl, pentyl, or hexyl radical, but preferably methyl or ethyl.

The compounds of this invention can be conveniently prepared from sapogenins such as diosgenin, yamogenin, correlagenin, and gentrogenin and their lower alkanoic acid esters. The sapogenin, or its lower alkanoic acid esters, in a suitable solvent, such as chloroform, is treated with an organic peroxy acid, such as peroxyacetic acid, peroxyphthalic acid and peroxybenzoic acid to form 3β-alkanoyloxy-5α,6α - epoxy - 22(α or β) - spirostan. The epoxide is then treated with an alkylmagnesium halide in a suitable solvent to form the 5α-hydroxy-6β-alkyltigogenin. Among the more suitable solvents are the aromatic hydrocarbons containing less than nine carbon atoms, such as benzene, toluene, and xylene. The reaction time is shorter when one of the higher boiling solvents in the group is used. The 5α-hydroxy-6-alkyl-tigogenin is heated with an acid anhydride to form 3β,26-dialkanoyloxy-6-alkyl-5,20(22)-furostadiene. This compound is not isolated, but is heated with an acidic solution of chromium trioxide and then treated with acid to yield the 3β-alkanoyloxy-6-alkyl-5,16-pregnadien-20-ones.

The compounds of this invention are valuable intermediates for the preparation of therapeutically active hormones, such as 6-alkylprogesterones and 17α-hydroxy-6-alkylprogesterones.

This invention will appear more fully from the examples which follow. These examples are set forth by way of illustration only, and it will be understood that the invention is not to be construed as limited in spirit or in scope by the details contained therein, as many modifications in materials and methods will be apparent to those skilled in the art. In these examples, temperatures are given in degrees centigrade (°C.) and quantities of materials in parts by weight.

The present application is a continuation-in-part of the copending application Serial No. 686,562, filed September 27, 1957, now U.S. Patent No. 2,878,246.

Example 1

To a solution of 100 parts of 3β-acetoxy-5(6),22α-spirosten (diosgenin acetate) in 748 parts of chloroform maintained at 0° C. are added 50 parts of monoperphthalic acid dissolved in ether. After standing at room temperature for 15 hours, the solution is filtered to remove the insoluble material and the filtrate is washed to neutrality with water. The filtrate is concentrated nearly to dryness on a steam bath and 400 parts of methanol are added. The solution is then concentrated to a volume of about 225 parts. The precipitate which forms is collected on a filter, and upon recrystallization from methanol there is obtained 3β-acetoxy-5α,6α-exoxy-22α-spirostan melting at about 231–233° C.

A solution of 40 parts of 3β-acetoxy-5α,6α-epoxy-22α-spirostan in 522 parts of benzene is cooled to 0° C., and 400 parts of a 3 molar solution of methyl-magnesium bromide in ether is slowly added. The resulting solution is refluxed for 8 hours and the excess methylmagnesium bromide is then decomposed by the slow addition of water. A small amount of a 5% solution of sulfuric acid is added to dissolve any precipitate which may have formed. The organic layer is separated, washed with water to neutrality, and evaporated to dryness on a steam bath. Upon recrystallization from a solution of chloroform and methanol there is obtained 3β,5α-dihydroxy-6β-methyl-22α-spirostan melting at about 220–222° C.

A solution of 43 parts of 3β,5α-dihydroxy-6β-methyl-22α-spirostan (5α-hydroxy-6β-methyltigogenin) in 200 parts of acetic anhydride is maintained at 195° C. for 8 hours and then is diluted with 500 parts of a 90% aqueous solution of acetic acid. The solution is cooled to about 15° C. and a solution of 17.5 parts of chromium trioxide in 40 parts of water and 200 parts of acetic acid is added. The mixture is allowed to stand at room temperature for about 30 minutes, and then is distilled under vacuum until a viscous oil is obtained. Approximately 100 parts of 80% acetic acid are added to this oil and the mixture is refluxed for 2 hours. Then water is added to the solution and the precipitate which forms is extracted with ethyl acetate. The extract is distilled to dryness. The residual yellowish green oil is taken up in ether and applied to a chromatography column containing silica gel. The column is developed with benzene and benzene solutions containing increasing amounts of ethyl acetate. Elution with a 10–15% solution of ethyl acetate in benzene affords 3β-acetoxy-6-methyl-5,16-pregnadien-20-one melting at about 114.5–117° C. Recrystallized from aqueous acetone it melts at about 121–122.5° C. The compound shows absorption in the infrared at 5.80, 6.02 and 6.31 microns.

Example 2

A solution of 40 parts of 3β-acetoxy-5α,6α-epoxy-22α-spirostan in 522 parts of benzene is cooled to 0° C., and 400 parts of a 3 molar solution of ethylmagnesium bromide are added slowly. The solution is refluxed for 8 hours. The excess ethylmagnesium bromide is decomposed by the slow addition of water. A sufficient amount of a 5% solution of sulfuric acid is added to dissolve any precipitate which may have formed. The organic layer is separated, washed with water to neutrality and evaporated to dryness on a steam bath. Upon recrystallization from a solution of chloroform and methanol there is obtained 3β,5α-dihydroxy-6β-ethyl-22α-spirostan.

A solution of 43 parts of 3β,5α-dihydroxy-6β-ethyl-22α-spirostan in 200 parts of propionic anhydride is heated at 195° C. for 8 hours. The solution is then diluted with 500 parts of a 90% aqueous solution of propionic acid. After cooling to a temperature of about 15° C., a solution of about 17.5 parts of chromium trioxide dissolved in 40 parts of water and 200 parts of propionic acid are added. The mixture is then allowed to stand at room temperature for about ½ hour and then is distilled under vacuum until a viscous oil is obtained. After addition of about 100 parts of an 80% solution of propionic acid, the mixture is refluxed for an additional 2 hours. Water is added to the solution until a precipitate appears. The precipitate is extracted with ethyl acetate. The ethyl acetate solution is evaporated to dryness. The residue is taken up in ether and applied to a chromatography column containing silica gel. The column is developed with benzene and benzene solutions containing increasing amounts of ethyl acetate. Upon elution with a 10–15% solution of ethyl acetate in benzene, there is obtained 3β-propionoxy-6-ethyl-5,16,pregnadien-20-one.

*Example 3*

To a solution of 1 part of 3β-acetoxy-6-methyl-5,16-pregnadien-20-one and 15 parts of tert-butanol there are added 12 parts of water containing 0.2 parts of potassium hydroxide. The mixture is refluxed for 30 minutes and then neutralized by addition of dilute acetic acid. The resulting precipitate is collected on a filter and washed with a mixture of acetone and water to yield 3β-hydroxy-6-methyl-5,16-pregnadien-20-one.

A mixture of 1 part of this alcohol with 7 parts of 90% formic acid is heated at about 65° C. for 90 minutes and then poured into water. The precipitate is recrystallized from acetone to yield 3β-formyloxy-6-methyl-5,16-pregnadien-20-one melting at about 149.5–151° C.

*Example 4*

A solution of 50 parts of 3β-acetoxy-6-methyl-5,16-pregnadien-20-one in 2400 parts of methanol is treated at room temperature with 18 parts of sodium hydroxide in 100 parts of water and 180 parts of 35% hydrogen peroxide. This mixture is kept at room temperature for 24 hours and then poured into water. The resulting precipitate is extracted with chloroform. The chloroform solution is washed with water, dried over anhydrous sodium sulfate and evaporated almost to dryness. The resulting residue is collected on a filter and recrystallized from a mixture of acetone and ether to yield 3β-hydroxy-6-methyl-16α,17α-epoxy-5-pregnen-20 - one melting at about 182–184° C.

A solution of 50 parts of this epoxide in 900 parts of anhydrous toluene is treated with 50 parts of cyclohexanone and a solution of 100 parts of aluminum isopropoxide in 900 parts of toluene. The mixture is refluxed for 30 minutes, cooled, and poured into ice water, acidified with dilute sulfuric acid, and extracted with benzene. The extract is steam distilled and the residue is extracted with ether. The ether solution is washed with water, dried over anhydrous sodium sulfate, filtered and taken to dryness. The residue is chromatographed over alumina. Elution with a 1:1 solution of hexane in benzene yields 6α-methyl-16α,17α-epoxy-4-pregnene-3,20 dione. This epoxide is reacted with an excess of hydrogen bromide in acetic acid solution at room temperature for 30 minutes. The mixture is then poured into ice water and the bromo-hydrin is collected on a filter. After drying, it is refluxed for 2 hours in methanol solution with twice its weight of Raney nickel. The Raney nickel is removed by filtration and the methanol solution is evaporated to dryness. The residue crystallizes in colorless needles. Recrystallization from aqueous acetone yields 6α-methyl-17α-hydroxyprogesterone melting at about 211–213° C.

What is claimed is:
1. A compound of the structural formula

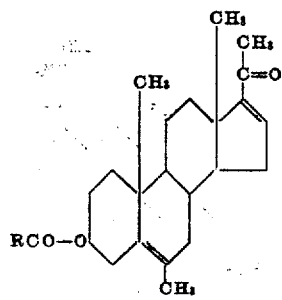

wherein R is a member of the class consisting of hydrogen and lower alkyl radicals.
2. 3β-acetoxy-6-methyl-5,16-pregnadien-20-one.
3. 3β-formyloxy-6-methyl-5,16-pregnadien-20-one.
4. A compound of the formula:

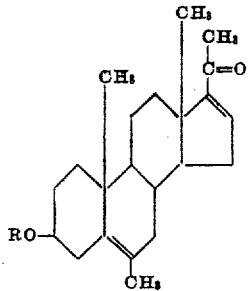

wherein R represents a lower alkanoyl radical.

References Cited in the file of this patent
UNITED STATES PATENTS 2,678,932   Buck et al. _____ May 18, 1954
2,702,297   Romo et al. _____ Feb. 15, 1955